US012670250B2

(12) United States Patent
Puhakainen et al.

(10) Patent No.: US 12,670,250 B2
(45) Date of Patent: Jun. 30, 2026

(54) MONITORING A COMPUTING SYSTEM WITH RESPECT TO A RECOVERY SCENARIO

(71) Applicant: Telefonaktiebolaget LM Ericsson (PUBL), Stockholm (SE)

(72) Inventors: Anu Puhakainen, Espoo (FI); Harri Hakala, Turku (FI); Joel Patrik Reijonen, Kirkkonummi (FI)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 145 days.

(21) Appl. No.: 18/693,583

(22) PCT Filed: Sep. 22, 2021

(86) PCT No.: PCT/EP2021/076126
§ 371 (c)(1),
(2) Date: Mar. 20, 2024

(87) PCT Pub. No.: WO2023/046284
PCT Pub. Date: Mar. 30, 2023

(65) Prior Publication Data
US 2024/0394365 A1      Nov. 28, 2024

(51) Int. Cl.
G06F 21/55            (2013.01)
(52) U.S. Cl.
CPC ...... G06F 21/554 (2013.01); G06F 2221/034 (2013.01)
(58) Field of Classification Search
None
See application file for complete search history.

(56) References Cited

U.S. PATENT DOCUMENTS

| | | | |
|---|---|---|---|
| 10,043,026 B1 * | 8/2018 | Salour ................. | G06F 11/1458 |
| 10,747,606 B1 | 8/2020 | Shemer et al. | |
| 10,997,015 B2 | 5/2021 | Singh et al. | |
| 11,561,851 B2 | 1/2023 | Wolfson et al. | |
| 2016/0044057 A1 * | 2/2016 | Chenette ................ | H04L 63/20 |
| | | | 726/1 |
| 2017/0302458 A1 | 10/2017 | Berger et al. | |
| 2018/0107534 A1 | 4/2018 | Angeles et al. | |

(Continued)

FOREIGN PATENT DOCUMENTS

| | | |
|---|---|---|
| WO | WO2021028060 A1 | 2/2021 |
| WO | WO2023046284 A1 | 3/2023 |

OTHER PUBLICATIONS

Okutan et al. "Forecasting Cyber Attacks with Imbalanced Data Sets and Different Time Granularities", Mar. 2018, pp. 1-13. (Year: 2018).*

(Continued)

*Primary Examiner* — Kaveh Abrishamkar
(74) *Attorney, Agent, or Firm* — Baker Botts L.L.P.

(57)            ABSTRACT

A method (200) for use in securing a computing system (416) against a recovery scenario from which the computing system would require recovery. The method comprises: i) obtaining (202) system recovery indicators for the computing system; and ii) predicting (204) a likelihood that the computing system will undergo the recovery scenario from the system recovery indicators using a model trained using a machine learning process that takes as input the system recovery indicators.

19 Claims, 5 Drawing Sheets

200

(56) References Cited

U.S. PATENT DOCUMENTS

| | | | | |
|---|---|---|---|---|
| 2018/0211042 | A1* | 7/2018 | Reinecke | G06F 21/568 |
| 2019/0007436 | A1* | 1/2019 | Dods | H04L 63/1425 |
| 2019/0166153 | A1 | 5/2019 | Steele | |
| 2019/0349400 | A1* | 11/2019 | Bruss | G06N 20/00 |
| 2020/0036743 | A1 | 1/2020 | Almukaynizi et al. | |
| 2020/0296124 | A1* | 9/2020 | Pratt | H04L 63/20 |
| 2020/0356675 | A1* | 11/2020 | Shakarian | G06F 18/2148 |
| 2020/0379853 | A1 | 12/2020 | Beloussov et al. | |
| 2021/0073083 | A1 | 3/2021 | Solanke et al. | |
| 2021/0182164 | A1* | 6/2021 | Yakushkin | G06F 11/263 |
| 2021/0232685 | A1* | 7/2021 | Kraemer | G06F 21/554 |
| 2022/0245245 | A1* | 8/2022 | Annen | G06N 20/00 |
| 2024/0201767 | A1* | 6/2024 | Boyd | G06F 11/0793 |
| 2024/0394365 | A1 | 11/2024 | Puhakainen et al. | |

OTHER PUBLICATIONS

Pivarnikova et al. "Early-Stage Detection of Cyber Attacks", 2020, pp. 1-22. (Year: 2020).*

Murugiah Souppaya et al. "Application Container Security Guide" NIST Special Publication 800-190—Sep. 2017.

Blake E. Strom et al. "Finding Cyber Threats with ATT&CK-Based Analytics" MTR170202, Mitre Technical Report; Dept. No. J83L—2017 The MITRE Corporation.

Karen Scarfone et al. "Guide to Security for Full Virtualization Technologies" Recommendations of the National Institute of Standards and Technology, Special Publication 800-125—Jan. 2011.

J.R. Quinlan "Induction of Decision Trees" Machine Learning 1: 81-106, 1986; 1986 Kluwer Academic Publishers, Boston—Manufactured in The Netherlands.

PCT International Search Report issued for International application No. PCT/EP2021/076126—May 31, 2022.

PCT International Preliminary Report On Patentability issued for International application No. PCT/EP2021/076126—Dec. 13, 2023.

Leo Breiman "Random Forests" Machine Learning, 45, 5-32, 2001; 2001 Kluwer Academic Publishers, Manufactured in The Netherlands.

Fabian Pedregosa et al. "Scikit-learn: Machine Learning in Python" Journal of Machine Learning Research 12 (2011) 2825-2830; Submitted Mar. 2011; Revised Aug. 2011; Published Oct. 2011.

PCT Written Opinion of the International Preliminary Examining Authority issued for International application No. PCT/EP2021/076126—Aug. 7, 2023.

PCT Written Opinion of the International Searching Authority issued for International application No. PCT/EP2021/076126—May 31, 2022.

Framework for Improving Critical Infrastructure Cybersecurity, Version 1.1, National Institute of Standards and Technology—Apr. 16, 2018 [due to size this reference has been split into two parts].

Michael Bartock "Guide for Cybersecurity Event Recovery" NIST Special Publication 800-184—Dec. 2016 [due to size, this reference has been split into two parts].

Paul Cichonski et al. "Computer Security Incident Handling Guide" Recommendations of the National Institute of Standards and Technology, Special Publication 800-61, Revision 2—Aug. 2012 [due to size, this reference has been split into three parts].

PCT International Preliminary Report on Patentability issued for International Application No. PCT/EP2021/076127—Dec. 15, 2023.

PCT International Search Report issued for International Application No. PCT/EP2021/076127—May 31, 2022.

PCT Written Opinion of the International Searching Authority issued for International Application No. PCT/EP2021/076127—May 31, 2022.

PCT Written Opinion of the International Preliminary Examining Authority issued for International Application No. PCT/EP2021/076127—Aug. 7, 2023.

\* cited by examiner

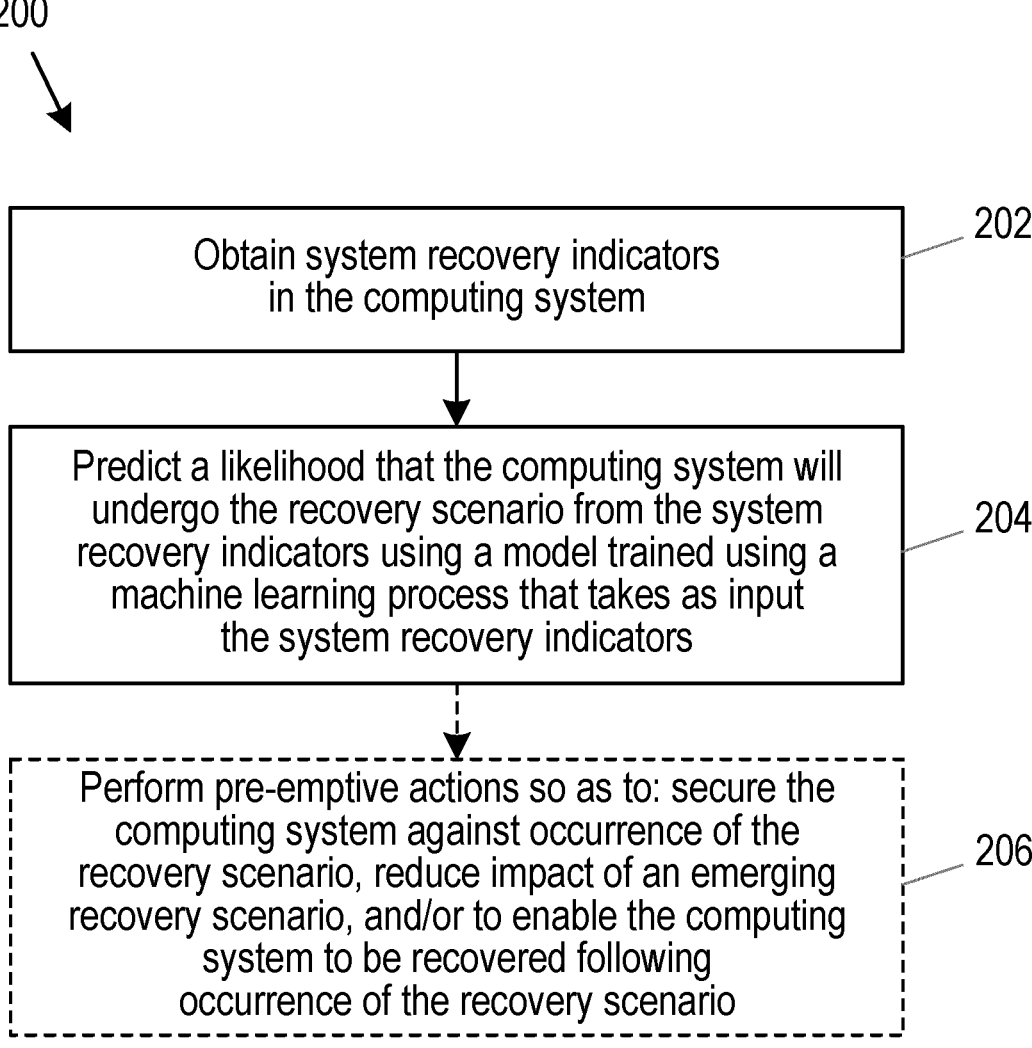

200

Obtain system recovery indicators
in the computing system                                                          202

Predict a likelihood that the computing system will
undergo the recovery scenario from the system
recovery indicators using a model trained using a                                204
machine learning process that takes as input
the system recovery indicators Perform pre-emptive actions so as to: secure the
computing system against occurrence of the
recovery scenario, reduce impact of an emerging                                  206
recovery scenario, and/or to enable the computing
system to be recovered following
occurrence of the recovery scenario

MONITORING A COMPUTING SYSTEM WITH RESPECT TO A RECOVERY SCENARIO

PRIORITY

This nonprovisional application is a U.S. National Stage Filing under 35 U.S.C. § 371 of International Patent Application Serial No. PCT/EP2021/076126 filed Sep. 22, 2021 and entitled "MONITORING A COMPUTING SYSTEM WITH RESPECT TO A RECOVERY SCENARIO" which is hereby incorporated by reference in its entirety.

TECHNICAL FIELD

This disclosure relates to security systems and security methods for monitoring a computing system. More particularly but non-exclusively, the disclosure relates to monitoring a computing system with respect to a recovery scenario from which the computing system would require recovery. The disclosure also relates to a computer program, a carrier and a computer program product.

BACKGROUND

This disclosure relates to systems for monitoring a computing system such as an Information Technology (IT) system and a telecommunications system with respect to recovery scenarios, from which the computing system would require system recovery (e.g. by restoring the system using back-ups and the like). Recovery scenarios may arise, e.g. through third party attacks, or other system failures due to factors such as hardware and/or software malfunctions or environmental factors (e.g. flooding or fire).

Current strategies for dealing with recovery scenarios include:

Developing appropriate activities i.e. processes to establish and maintain recovery plans and strategies for resilience and to restore any capabilities or services. The focus is generally on processes, strategies, lessons learned, managing public relations and giving guidance for how to develop recovery plans. Such strategies are described in the documents: "NIST Cybersecurity Framework v1.1, recover controls", section 2.1 and Appendix A; and NIST SP800-184 Guide for Cybersecurity Event Recovery.

Performing regular backups of the systems and storing them into remote destination(s) for later usage. Restoring backups is regarded as the main technical recovery action and executed according to business continuity and disaster recovery plans and processes.

Administrators restoring systems from clean backups, installing patches, rebuilding systems from scratch, changing passwords and tightening network perimeter security. Such strategies are described in the document: "NIST SP800-61 Computer Security Incident Handling Guide"; section 3.3.4.

Scale-in and scale-out technologies are used for virtualized environments, mainly from the performance and capacity perspective.

The main philosophy in the existing technology and processes used is to prevent recovery situations taking place by having in depth protection mechanisms in place to prevent or stop the attacks in the first place. This is performed by deploying firewalls, intrusion prevention systems and security incident and event management systems.

Another strategy involves performing regular penetration tests for the systems to reveal weak points and existing exploitable vulnerabilities in the systems and addressing those vulnerabilities. Known vulnerabilities may be remediated by installing security patches to the systems in order to prevent incidents exploiting known vulnerabilities from taking place.

There are various problems associated with current recovery solutions that arise because system recovery is often considered and addressed primarily from an operational process and strategy perspective using recovery plans, recovery processes and activity descriptions which may be in paper format. Furthermore, current solutions may focus on training perspectives associated with executing aftermath and "lessons learned" exercises, raising awareness, public relations/brand reputation perspectives and/or communication recovery activities towards company management.

SUMMARY

An object of the invention is to improve security and enable a more effective maintenance of a computer system. The invention enables the impact of a recovery scenario to be reduced and recovery outcomes to be improved. Embodiments herein describe solutions to predict that a potential recovery scenario is approaching and describe ways in which to turn the course of events in such a way that full recovery processes are not required e.g. by limiting or minimising consequences of an emerging recovery scenario.

As noted in the Background, current security solutions tend to focus on detecting and patching system vulnerabilities in order to prevent a recovery scenario from occurring in the first place. In the event that a recovery scenario occurs, current solutions then focus on damage limitation and system recovery.

Thus, according to a first aspect herein there is a method for use in monitoring a computing system with respect to a recovery scenario from which the computing system would require recovery. The method comprises i) obtaining system recovery indicators for the computing system; and ii) predicting a likelihood that the computing system will undergo the recovery scenario from the system recovery indicators using a model trained using a machine learning process that takes as input the system recovery indicators.

According to a second aspect there is a security system for use in monitoring a computing system with respect to a recovery scenario from which the computing system would require recovery. The security system is configured to: obtain system recovery indicators for the computing system; and predict a likelihood that the computing system will undergo the recovery scenario from the system recovery indicators using a model trained using a machine learning process that takes as input the system recovery indicators.

According to a third aspect there is a security system for use in monitoring a computing system with respect to a recovery scenario from which the computing system would require recovery. The security system comprises a memory comprising instruction data representing a set of instructions, and a processor configured to communicate with the memory and to execute the set of instructions. The set of instructions, when executed by the processor, cause the security system to: obtain system recovery indicators for the computing system; and predict a likelihood that the computing system will undergo the recovery scenario from the system recovery indicators using a model trained using a machine learning process that takes as input the system recovery indicators.

According to a fourth aspect there is a computer program comprising instructions which, when executed on at least one processor of a security system, cause the security system to carry out the method of the first aspect.

According to a fifth aspect there is a carrier containing a computer program according to the fourth aspect, wherein the carrier comprises one of an electronic signal, optical signal, radio signal or computer readable storage medium.

According to a sixth aspect there is a computer program product comprising non transitory computer readable media having stored thereon a computer program according to the fourth aspect.

As described above, aspects herein advantageously allow recovery scenarios to be detected before they occur, or as they are emerging (e.g. as they are in progress), allowing actions to be taken in advance of as the recovery scenario unfolds in order to reduce damage to the computing system and/or increase effectiveness of recovery of the computing system following occurrence of the recovery scenario.

BRIEF DESCRIPTION OF THE DRAWINGS

For a better understanding and to show more clearly how embodiments herein may be carried into effect, reference will now be made, by way of example only, to the accompanying drawings, in which:

FIG. 2 illustrates a method for use in monitoring a computing system with respect to a recovery scenario from which the system would require recovery;

DETAILED DESCRIPTION

The disclosure herein relates to security systems for computing systems such as IT systems or telecommunications systems. More generally, any computing system e.g. comprising servers, or virtual servers that run software programs and/or store data.

Figure 1:
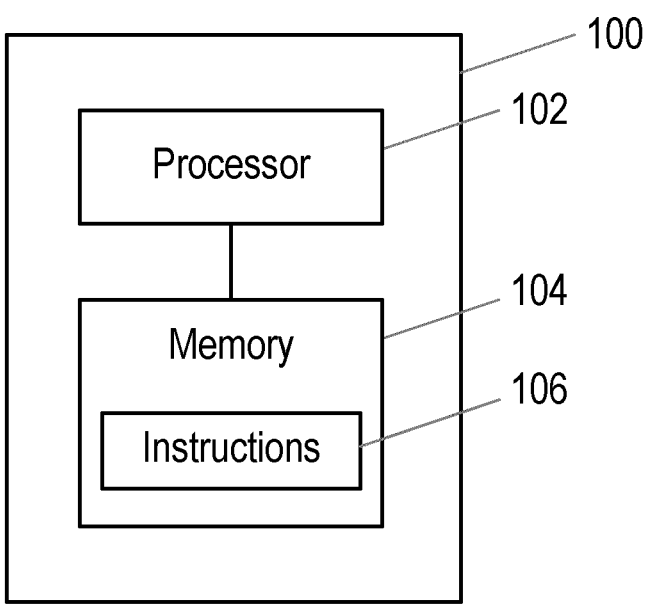
FIG. 1 shows a security system according to some embodiments herein.

FIG. 1 shows an example apparatus in the form of a security system 100 that may be comprised in (e.g. form part of), or host a security system according to some embodiments herein. The security system 100 is configured (e.g. adapted, operative, or programmed) to perform any of the embodiments of the method 200 as described below.

The security system 100 here comprises a processor (e.g. processing circuitry or logic) 102. The processor 102 may control the operation of the security system 100 in the manner described herein. The processor 102 can comprise one or more processors, processing units, multi-core processors or modules that are configured or programmed to control the security system 100 in the manner described herein. In particular implementations, the processor 102 can comprise a plurality of computer programs and/or hardware modules that are each configured to perform, or are for performing, individual or multiple steps of the functionality of the security system 100 as described herein.

The security system 100 comprises a memory 104. In some embodiments, the memory 104 of the security system 100 can be configured to store a computer program 106 with program code or instructions that can be executed by the processor 102 of the security system 100 to perform the functionality described herein. Alternatively or in addition, the memory 104 can be configured to store any requests, resources, information, data, signals, or similar that are described herein. The processor 102 may be configured to control the memory 104 to store any requests, resources, information, data, signals, or similar that are described herein.

It will be appreciated that the security system 100 may comprise one or more virtual machines running different software and/or processes. The security system 100 may therefore comprise one or more servers, switches and/or storage devices and/or may comprise cloud computing infrastructure or infrastructure configured to perform in a distributed manner, that runs the software and/or processes.

It will be appreciated that the security system 100 may comprise other components in addition or alternatively to those indicated in FIG. 1. For example, in some embodiments, the security system 100 may comprise a communications interface. A communications interface may be for use in communicating with other apparatuses e.g. via a communications network, (e.g. such as other physical or virtual computing nodes). For example, the communications interface may be configured to transmit to and/or receive from nodes or network functions requests, resources, information, data, signals, or similar. The processor 102 may be configured to control such a communications interface to make/receive such transmissions.

The security system 100 may be implemented in (e.g. form part of) a communications network. In some embodiments herein, the security system 100, may be implemented in a management layer of a communications network.

More generally, the security system 100 may be implemented in any node/network device of a communications network. For example, the security system 100 may comprise any component or network function (e.g. any hardware or software) in a communications network suitable for performing the functions described herein. Examples of nodes include but are not limited to core network functions such as, for example, core network functions in a Fifth Generation Core network (5GC). It is realized that the security system 100 may be included as a node/device in any future network, such as a future 3GPP ($3^{rd}$ Generation Partnership Project) sixth generation communication network, irrespective of whether the security system 100 would there be placed in a core network or outside of the core network.

A communications network or telecommunications network may comprise any one, or any combination of: a wired link (e.g. ASDL) or a wireless link such as Global System for Mobile Communications (GSM), Wideband Code Division Multiple Access (WCDMA), Long Term Evolution (LTE), New Radio (NR), WiFi, Bluetooth or future wireless technologies. The skilled person will appreciate that these are merely examples and that a communications network may comprise other types of links. A wireless network may be configured to operate according to specific standards or other types of predefined rules or procedures. Thus, a wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Generally (as will be described in more detail below), the security system 100 is for use in monitoring a computing system with respect to a recovery scenario from which the computing system would require recovery. For example, the security system may be used to secure the computing system against the recovery scenario. The security system 100 may be used to detect a possible, future recovery scenario for the computer system.

Briefly the security system 100 is configured to i) obtain system recovery indicators for the computing system; and ii) predict a likelihood that the computing system will undergo the recovery scenario from the system recovery indicators using a model trained using a machine learning process that takes as input the system recovery indicators.

Turning now to FIG. 2, there is a method 200 for use in monitoring a computing system with respect to a recovery scenario from which the computing system would require recovery. The method 200 is computer implemented. Briefly, in a first step 202, the method 200 comprises i) obtaining system recovery indicators for the computing system. In a second step 204 the method comprises ii) predicting a likelihood that the computing system will undergo the recovery scenario from the system recovery indicators using a model trained using a machine learning process that takes as input the system recovery indicators.

The method 200 may be performed by an apparatus such as the security system 100 described above. Generally, the method 200 may be performed on system recovery indicators obtained from a computing system in real-time on a computing system as part of a security procedure to secure the computing system against recovery scenarios. Obtaining the system recovery indicators may be done by receiving or retrieving the system recovery indicators from the computing system. For example, the security system 100 may send requests to the computing system (or other entity monitoring the computing system) to obtain the system recovery indicators.

A computing system may comprise one or more servers that store data and/or run processes. A computing system may comprise virtual components, for example, one or more virtual servers, virtual machines (VMs), application containers, Virtual Network Function (VNFs) or Cloud-Native Network Functions (CNF).

A computing system may be used by users to run software packages and/or access data held on the computing system. The computing system may be associated with an organisation such as a government organisation, business or home. The computing system may store data and provide access to services for users of the organisation associated with the organisation. In some examples, the computing system may be an Information Technology (IT) system.

In some embodiments, the computing system may be a node in a communications network. Communications networks and nodes therein were described above with respect to the security system 100 and the detail therein will be understood to apply equally to examples of the computing system. In some embodiments herein, the method 200 may be performed in a management layer/Operations Support System layer of a communications network. Thus, the security systems and methods herein may be used to monitor network nodes in communications systems to mitigate against recovery scenarios therein.

The method 200 may be performed on a computing system as part of a security procedure. E.g. as part of ongoing threat monitoring. For example, the method 200 may be used to secure the computing system against recovery scenarios.

As used herein, a recovery scenario comprises any situation, action or incident which results in the computing system requiring (e.g. needing) recovery. In other words, a scenario from which a recovery procedure will be performed. Recovery scenarios may arise maliciously or non-maliciously. A recovery scenario may compromise the computing system or a part of the computing system, e.g. by rendering part of the computing system inoperable or inaccessible.

Recovery scenarios may be caused by a wide range of factors. For example, a recovery scenario may be caused by: an external (e.g. third party) attack on the computing system, e.g. a malicious attack by a person unauthorised to use the computing system; an internal security breach (e.g. caused by a malicious user of the computing system); a system failure of the computing system, e.g. such as a hardware or software failure; an adverse environmental condition; an uncontrolled system change; and/or human error. In this sense, uncontrolled system changes may comprise, for example, an authorization of changes of software or software settings, introduction of a poorly tested software package, and/or transferal of software in an uncontrolled manner between development/staging and production sites. The skilled person will appreciate that these are merely examples, and that the methods described herein may be applied to any recovery scenario from which the computer system would require recovery.

As used herein, recovery may comprise restoring the computing system in order to make it accessible and/or operable. Recovery may comprise restoring the computing system to (or as close as possible to) its previous operating state before the occurrence of the recovery scenario.

The systems and methods herein might be used to avoid recovery by predicting (e.g. noticing) that the system is approaching a recovery scenario and by performing preventative actions to prevent the actual recovery scenario from taking place. In more detail, in step i) the method 200 comprises obtaining 202 system recovery indicators (e.g. values or other data indicative thereof) for the computing system. System recovery indicators may comprise any information or data that may be used to predict that the system is going to undergo a recovery scenario (e.g. and require recovery). System recovery indicators may thus comprise any information indicative of change, instability or unusual behaviour in a computing system that might be indicative of system compromise. For example, the system recovery indicators may comprise data representing: system access patterns; traffic flow patterns through the system; and/or indicators of system vulnerabilities. Generally, system recovery indicators may comprise any marker associated with recovery scenarios.

Examples include but are not limited to indicators related to:

Initial Access e.g. failing admin logins and password failures within specific timeframe Defence Evasion e.g. audit logging changes in several nodes, inbound traffic appearing in a port where usually there is no/limited amount of traffic, Discovery e.g. increasingly failing technical security controls in the network, high number of unpatched known vulnerabilities in a system, high CVE scores for known unpatched vulnerabilities, information available in public hacker sources Lateral movement e.g. indicators relating to the detection of techniques that a cyberattacker uses, after gaining initial access, to move deeper into a network in search of sensitive data and other high-value assets. Lateral movement indicators include but are not limited to configuration or file integrity breaks in one or more nodes (e.g. within a specific timeframe), changes in patterns of the behaviour of privileged users which might indicate that the cyberattacker is using the privileged user account instead of the intended user, indications of new (or unauthorised) user accounts having been created (e.g. by an attacker), and indications that information relating to known vulnerabilities has been exploited.

Collection e.g. outbound traffic in a port where usually there is no/limited amount of traffic Life-cycle status e.g. software release is 6 months or older in a system, time of latest configuration change, rate of patching Further examples are described as part of the MITRE™ ATT&ACK™ framework (see MITRE technical report document MT R 17 02 02). The skilled person will appreciate that these are merely examples however and that many different types of system recovery indicators may be used.

In step 202 of the method 200, the system recovery indicators (or values thereof) may obtained (or collected) from the computing system. For example, from log data. Step 202 may thus comprise sending a message to one or more components of programs in the computing system, to request the component or program provide the system recovery indicators.

Step 202 may further comprise receiving messages comprising system recovery indicators from one or more components or programs in the computing system.

Turning to step 204, the method comprises ii) predicting a likelihood that the computing system will undergo the recovery scenario from the system recovery indicators using a model trained using a machine learning process that takes as input the system recovery indicators.

In this sense, a likelihood may be any indication of certainty that the computing system is undergoing, or is going to undergo, the recovery scenario. The likelihood may be numerical, e.g. in the form of a probability value, or risk score. In other examples the likelihood may be graded into categories, for example "high", "medium" or "low" likelihood/risk/probability.

In some embodiments, step 204 comprises predicting a plurality of likelihood values, each indicating a likelihood that the computing system will undergo a different type of recovery scenario. For example, step 202 may comprise predicting a tuple of likelihood values for different scenarios, such as: [Scenario X: 0.2; Scenario Y: 0.5; Scenario X: 0.1]. The likelihood is predicted using machine learning. For example, in some embodiments, the step of predicting is performed using a model trained using a machine learning process that takes as input the system recovery indicators.

The model may provide an output that can be used to determine the likelihood that the computing system will undergo the recovery scenario. In some examples, the model may output (e.g. directly) the likelihood that the computing system will undergo the recovery scenario.

In other embodiments, the model may output data that can be used to predict or calculate the likelihood.

The machine learning model may have been trained using supervised learning. For example, the model may have been trained using training data comprising a plurality of training examples, each training example comprising: example system recovery indicators obtained for an example computing system, and a ground truth likelihood value that said example computing system (having the example system recovery indicators) will undergo the recovery scenario.

In such examples, the training data comprises example inputs and the ground truth likelihood values which represent the "correct" outputs for each example input. A training dataset may be compiled by a human-engineer, for example, by manually assessing the training examples and assigning the ground truth label to each example. In other examples, a training dataset may be labelled in an automated (or semi-automated manner) based on predefined criteria defined by a human engineer.

Generally, training data can be obtained following occurrence of recovery scenarios in the example computing systems. For example, as part of a post recovery activity identified system recovery indicators, and ground truth labels can be provided to the model for further training. In this way, the model can be continuously updated on emerging recovery scenarios in real computing systems.

The skilled person will be familiar with machine learning processes and machine learning models that can be trained using training data to predict outputs for given input parameters.

A machine learning process may comprise a procedure that is run on data to create a machine learning model. The machine learning process comprises procedures and/or instructions through which training data, may be processed or used in a training process to generate a machine learning model. The machine learning process learns from the training data, for example the process may be fitted to the training data. Machine learning processes can be described using math, such as linear algebra, and/or pseudocode, and the efficiency of a machine learning process can be analyzed and quantized. There are many machine learning processes, such as e.g. algorithms for classification, such as k-nearest neighbors, algorithms for regression, such as linear regression or logistic regression, and algorithms for clustering, such as k-means. Further examples of machine learning models are Decision Tree models and Artificial Neural Network models. Machine learning algorithms can be implemented with any one of a range of programming languages.

The model, or machine learning model, may comprise both data and procedures for how to use the data to e.g. make the predictions described herein. The model is what is output from the machine learning (e.g. training) process, e.g. a collection of rules or data processing steps that can be performed on the input data in order to produce the output. As such, the model may comprise e.g. rules, numbers, and any other algorithm-specific data structures or architecture required to e.g. make predictions.

Different types of models take different forms. Some examples of machine learning processes and models that may be used herein include, but are not limited to: linear regression processes that produce models comprising a vector of coefficients (data) the values of which are learnt through training; decision tree processes that produce models comprising trees of if/then statements (e.g. rules) comprising learnt values; or neural network models comprising a graph structure with vectors or matrices of weights with specific values, the values of which are learnt using machine learning processes such as backpropagation and gradient descent.

In some embodiments, the model may be a classification model, which outputs the likelihood in the form of one or more predetermined classes (for example such as "low", "medium" or "high" likelihood). In other embodiments, the model may be a regression model that outputs a likelihood value on a continuous scale. For example, from 0 to 1.

In some embodiments, the model is a decision tree or a random forest-based classifier. Such models are well suited to the prediction step herein as they are good for processing multi feature inputs (collected from the security domain) where output is given by the result of a security analyst. Moreover, tree-based models are good not only to find relations in feature spaces but also non-linear relations as well. The skilled person will be familiar with decision trees and random forest models, which are described in detail in the papers: Quinlan (1986) entitled: "*Induction of decision trees*" Machine Learning volume 1, pages 81-106 (1986); and Breiman (2001) entitled "Random Forests"; Mach Learn 45 (1): 5-32. The skilled person will appreciate that a wide range of other types of machine learning models may equally be used, including but not limited to deep neural network models.

As an example of how a model might be trained, training data may be obtained comprising different system recovery indicators otherwise known as "features" at a given time instance. For each training example a human security analyst may provide a ground truth classification and label each training example as "anomalous" or "regular" as below. Training data:

| feature 1 | feature 2 | feature 3 | output (security analyst labels) |
|---|---|---|---|
| 1 | 2 | 5 | (1.0 Likelihood) |
| 2 | 2 | 2 | (0.0 Likelihood) |

The features are then used in off-line training of a machine learning model. When live data is received, the trained machine learning model then provides equivalent output for the same input data. For example:
Live data:

| feature 1 | feature 2 | feature 3 | output (security analyst labels) |
|---|---|---|---|
| 1 | 2 | 5 | (0.8 Likelihood) |
| 2 | 2 | 2 | (0.2 Likelihood) |

A model may be trained and verified as follows:
1) A first portion of labelled data (in this example, ~70%) is used for training the model. As an example, a decision tree may be set up using a standard ML model library such as the sci-kit-learn library which is described in the paper "*Scikit-learn: Machine Learning in Python*", by Pedregosa et al., JMLR 12, pp. 2825-2830, 2011. A decision tree may be trained, for example, following the principles of classifier.fit( )—from scikit-learn, see for example, chapter 1.10 of the scikit-learn 0.23.2 documentation.
   When a decision tree is trained, for example, the decision tree learns decision boundaries by combining of simple thresholding rules. Humans are generally only capable of compiling decisions in three or four higher level boxes, but ML models are able to perform a deeper analysis.
   Supervised learning involves learning the link between two datasets: the observed data X and an external variable y that one is trying to predict, usually called "target" or "labels" (e.g. ground truth). Most often, y is a 1D array of length n_samples. All supervised estimators in scikit-learn implement a fit (X, y) method to fit the model and a predict (X) method that, given unlabeled observations X, returns the predicted labels y.
   The clf (for classifier) estimator instance is first fitted to the model; that is, it must learn from the model. This is done by passing a training set to the fit method. For the training set, all the feature set from a dataset are used, except for the last feature set, which will be reserved for predicting. One can select the training set with the [:−1] Python syntax, which produces a new array that contains all but the last item from the array
   Now one can predict new values. In this case, one will predict using the last feature set from the array. By predicting, one will determine the feature set from the training set that best matches the last feature set.
2) A second (smaller) portion of labelled data (~20% is used for testing the model and performing hyper parameter tuning (this may be performed, for example, using classifier.predict( )—from scikit-learn, referenced above). If the predicted values are not sufficiently accurate, then the labelled data can be shuffled and used to train the model again in order to avoid overfitting. The f1-score which describes the balance between precision and recall of the trained model, can be used to determine whether the model is sufficient, for example, if the f1-score is less than 0.5 then the model may be re-trained.
3) A third portion of labelled data (~10%) is used to do the final validation of the model. The f1-score is one example mathematical method which can be used to evaluate the fitness of the model.

In some embodiments, different models may be trained, dependent on the system recovery indicators that are available. Such models may be stored in a repository of trained models and requested/obtained as needed.

The method 200 may thus further comprise steps of requesting a model from a repository comprising a plurality of trained (e.g. pre-trained) models. Responsive to determining that none of the trained models in the repository take as input the system recovery indicators, the method may further comprise training the model (e.g. training a new model), using the training data. Thus, in this way, models can be stored for quick retrieval and use, yet if a model is unavailable with the required input parameters, a new model can be trained. Thus, an applicable model may be obtained, no matter which system recovery indicators are available.

Turning now to other examples, it is noted that recovery scenarios typically unfold in a predictable manner, for example, particular system recovery indicators may appear, or their values may begin to change before other system recovery indicators, e.g. in a sequence. As such, different types of system recovery indicators may typically be associated with the early stages of an emerging recovery scenario, whilst others may be associated with the late stages of a recovery scenario. Thus, different recovery scenarios may be thought of as having different profiles or signatures as the different system recovery indicators evolve as a recovery scenario unfolds.

As an example, low rates of security patching or out of date software may be early-stage indicators of an emerging recovery scenario caused by a third-party attack; failing admin logins may then present, followed by outbound traffic in a port where usually there is no/limited amount of traffic as the third party attack progresses.

As such, step 204 of the method 200 may comprise analysing a time-profile of changes in the system recovery indicators in order to predict the likelihood that the computing system will undergo the recovery scenario.

In embodiments where step 204 is performed using machine learning (as described above), the system recovery indicators may be classified (or associated with classifications) indicating whether each system recovery indicator is a comparatively early indicator of the recovery scenario or a comparatively late indicator of the recovery scenario, when compared to other system recovery indicators, as the recovery scenario unfolds. In other words, whether each system recovery indicator is an early or late indicator of the recovery scenario, compared to other system recovery indicators. The model may further take the classifications as input. Providing indications of whether the system recovery indicator is commonly associated with the comparatively early or late-stages of an emerging recovery scenario as input to the machine learning model may enable the machine learning model to be trained more quickly, on less training examples as the classifications are further correlated with the ground truth likelihoods.

Turning to other embodiments, it is noted that the predictions in step 204 may be made based on different time horizons. For example, the system recovery indicators may be determined during a predetermined sliding time interval. In other words, a sliding window of fixed duration preceding the prediction.

The likelihood that the computing system will undergo the recovery scenario may be predicted for different time horizons. For example, the likelihood may reflect the instantaneous likelihood that the computing system is undergoing a recovery scenario. In other examples, the likelihood may reflect the likelihood that the computing system will undergo the recovery scenario at a predetermined time interval after the system recovery indicators were obtained. For example, a prediction that in x seconds, or y hours that the computing system will undergo the recovery scenario.

In embodiments where the likelihood is predicted by a machine learning model, the machine learning model may be trained to output likelihood values at different time horizons (e.g. with confidence levels for each).

In some embodiments, the method 200 may be used for ongoing monitoring and prediction of recovery scenarios. For example, the method 200 may further comprise repeating steps i) and ii) (e.g. steps 202 and 204) in an iterative manner on successive real-time system recovery indicators.

The method 200 may further comprise, responsive to the predicted likelihood, performing 206 pre-emptive actions so as to secure the computing system against occurrence of the recovery scenario; reduce impact of an emerging (or ongoing) recovery scenario and/or to enable the computing system to be (better) recovered following occurrence of the recovery scenario.

Pre-emptive actions may be performed, for example, if the likelihood is over a threshold likelihood for a particular recovery scenario. As an example, the threshold may be set at 60% likelihood. This is merely an example however, and the skilled person will appreciate that this may be set at different levels depending on factors such as the criticality of the computing system being protected.

Different pre-emptive actions may be performed depending on the recovery scenario that is predicted. For example, the pre-emptive actions may comprise actions such as taking (e.g. creating or updating) an image of part of the computing system; moving or encrypting data within the computing system; and/or applying a new security control to the computing system.

The skilled person will be familiar with images (e.g. recovery images) in the context of computing systems, but in brief an image is an image of the computing system at its current state that can be stored and applied to a (different) hard drive at any given time to restore the computing system. Images may otherwise be known as a hard drive snapshot. An image, (or improved or updated image) may allow for improved recovery of the computing system.

Examples of images include but are not limited to different variants of software (SW) packages e.g. monolithic SW package, application image (virtual network function, VNF or Core Network Function, CNF), Virtual Machine (VM) image, container image, docker image and/or microservices.

Various images are described in the National Institute of Standards and Technology (NIST) Special Publication 800-190 entitled, "Application Container Security Guide" by Souppaya, Morello and Scarfone; see for example, chapter 2.3 on *Container Technology Architecture*. See also NIST publication 800-125 entitled Guide to Security for Full Virtualization Technologies" by Scarfone, Souppaya and Hoffman.

The image may further be targeted to specific parts of the computing system, for example, parts that are predicted to be vulnerable based on the security scenario that has been predicted. This can enable targeted backups of the most vulnerable areas and enable better system recovery in scenarios where time is short such, for example, if the security scenario is imminent or currently ongoing.

In some embodiments, appropriate pre-emptive actions may be predicted by the model. For example, the pre-emptive actions that should be performed may be provided as an additional output of the model.

This may be achieved by providing, for each training example in the training data set, a second label, indicating pre-emptive actions that should be performed for the respective training example. In other words, by providing ground truth indications of pre-emptive actions appropriate for a computing system having the system recovery indicators in the training example.

The model may then be trained to predict both the likelihood that the computing system will undergo the recovery scenario and the appropriate pre-emptive action(s) that should be taken.

In other examples, another (e.g. second) model may be trained to predict appropriate pre-emptive actions. For example, a second model (of any of the types described above) may be trained to take as input parameters such as system recovery indicators, a type of recovery scenario, a risk level for said type of recovery scenario, and output appropriate pre-emptive actions.

Figure 3:
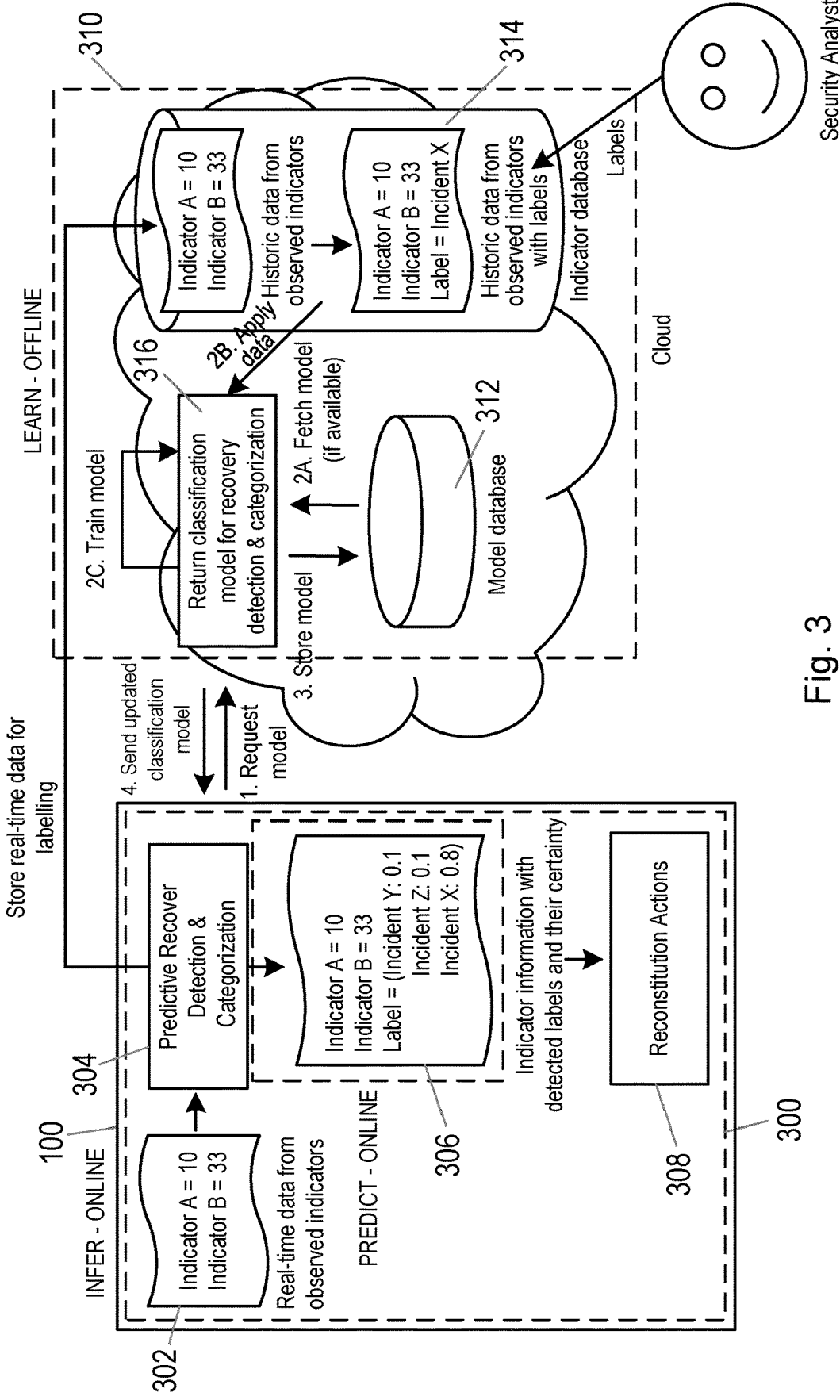
FIG. 3 shows a security system according to some embodiments herein.

Turning now to FIG. 3, there is a security system 100 according to an embodiment herein. In this embodiment, machine learning models are used to predict the likelihood of different security scenarios occurring.

In this embodiment, the method 200 is performed by a "recovery engine" module 300. The recovery engine 300 may be part of the security system 100 described above. For example, a memory 104 may comprise instructions that when run on a processor 102, perform the actions described below. The recovery engine module 300 comprises a computing module 304 which may be described as a "Predictive Recover Detection & Categorisation" module. Predictive Recover Detection & Categorisation Module 304 obtains system recovery indicators 302 for the computing system that is being monitored and makes an online (e.g. real-time) prediction of likeliness 306 that the computing system will undergo different recovery scenarios.

In this embodiment, the predictions are made using a model trained using a machine learning process. The model may be trained using an Offline Machine Learning (offline ML) training engine 310. The offline ML training engine 310 may be based in the cloud and used for training machine-learning recovery classification models based on historical information. The offline ML training engine may then store the trained models in a Model database 312 and send updated classification models to the Predictive Recover Detection & Categorisation module 304 for online use.

The Offline ML Training Engine 310 is a supporting component used for training the machine-learning recovery classification models based on historical information. In offline machine learning, the ML Engine gathers and mediates data from multiple instances into a database of training examples 314 in order to build machine learning models that describe how different indicators have been labelled in the historic data. This happens by storing real-time data from running instances that has the labels provided by a security analyst. In this embodiment, Offline ML Training Engine 310 utilizes supervised machine learning, for example, classification methods in predictive recovery detection & categorization. As noted above, suitable classifiers may be decision tree and/or random forest-based classifiers. The Offline ML Training Engine 310 maintains a model database where trained models are stored for long-term utilization. This is justified by the fact that model training can consume significant amounts of time and computational resources, so if a running security node requires an updated model, there is a possibility to provision a pre-trained model that can be executed in the node with decreased latency.

In the system of FIG. 3, the recovery engine 300 requests (message 1) a classification model from Offline ML Training Engine 310 (running in cloud). The Training Engine processes the request and tries to fetch (message 2.A) a pre-trained model in a model database for rapid provisioning of the model for the requesting instance. If there are no feasible model available, or the models are outdated, then the Training Engine executes machine learning model training (process 2.C). In model training, the Training Engine utilizes stored historic data from observed indicators that have labels assigned by a security analyst (message 2.B). After the model training is finished, the Training Engine stores the model in a model database for future utilization (message 3). Finally, the Training Engine returns an updated classification model to the requesting instance (message 4).

The recovery engine 300 can deploy the classification model directly to the predictive recovery detection & categorization-pipeline where the model is applied when the engine strives to predict possible recovery-related labels based on real-time observations. Based on the predicted likelihoods, which may be in the form: [Incident X, Y, Z: probability score Px,Py,Pz], the recovery engine can take pre-emptive actions, as described above, in order to secure the computing system against occurrence of the recovery scenario; reduce impact of an emerging recovery scenario; and/or to enable the computing system to be recovered following occurrence of the recovery scenario.

Thus, the security system of FIG. 3 can be used to monitor and assess the significance of security recovery indicators in order to monitor and reduce the impact of recovery scenarios. The skilled person will appreciate that this is merely an example architecture of a security system and that the functionality described above may be performed by different modules and/or may be split between a different number of modules to that described above.

Figure 4:
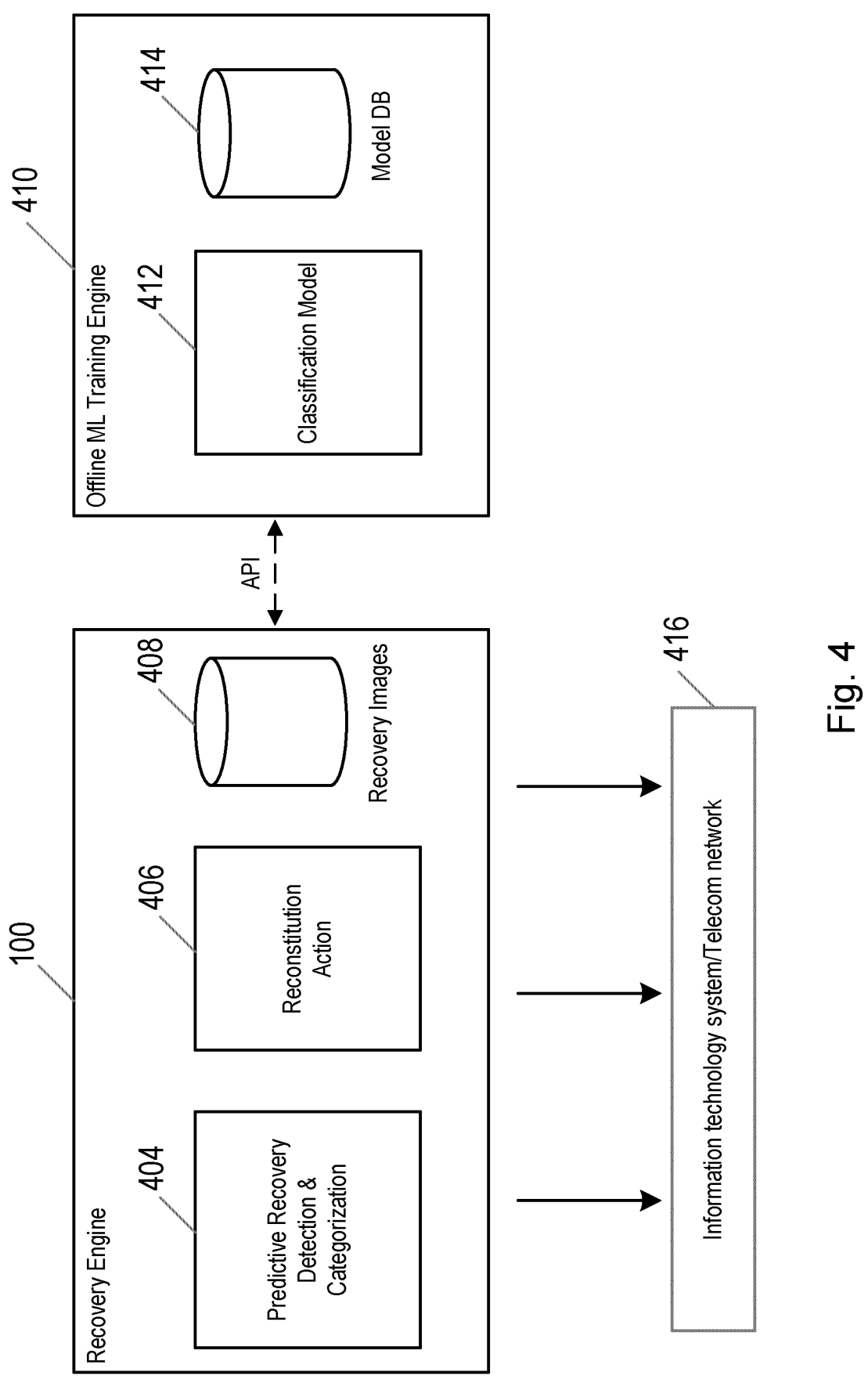
FIG. 4 shows another security system according to some embodiments herein.

Turning to FIG. 4, there is an example architecture of a security system 100 for monitoring a computing system 416 such as an Information Technology (IT) system or a network node in a telecommunications network with respect to a recovery scenario from which the computing system would require recovery. The security system 100 may comprise a processor 102, a memory 104 and a computer program 106, as described above with respect to FIG. 1. For example, a memory 104 may comprise instructions that when run on a processor 102, perform the actions described below.

In this example, a Prediction Recovery Detection & Categorisation module 404 performs the method 200 as described above, by obtaining 202 system recovery indicators from the IT system/Telecoms network 416 and predicting 204 a likelihood that the computing system will undergo the recovery scenario from the system recovery indicators using a model trained using a machine learning process that takes as input the system recovery indicators. As in the example in FIG. 3, the prediction in step 204 is performed using an offline ML training engine 410 that provides a classification model 412 from a database of models 414 to the security system by means of an application programming interface (API).

The Prediction Recovery Detection & Categorisation module 404 uses the classification model 412 to determine the likelihood of the recovery scenario and performs pre-emptive actions to mitigate against likely scenarios. The pre-emptive actions are determined by a Reconstitution Action Module 406. Such pre-emptive actions may comprise taking images of part(s) of the computing system, as described above, and these may be stored in a database 408.

The skilled person will appreciate that this is merely an example architecture of a security system and that the functionality described above may be performed by different modules and/or may be split between a different number of modules to that described above.

Turning now to other embodiments, there is provided a computer program product comprising a computer readable medium, the computer readable medium having computer readable code embodied therein, the computer readable code being configured such that, on execution by a suitable computer or processor, the computer or processor is caused to perform the method or methods described herein.

Thus, it will be appreciated that the disclosure also applies to computer programs 106. A computer program comprises instructions which, when executed on at least one processor of a security system 100, cause the security system 100 to carry out the method described herein.

Figure 5:
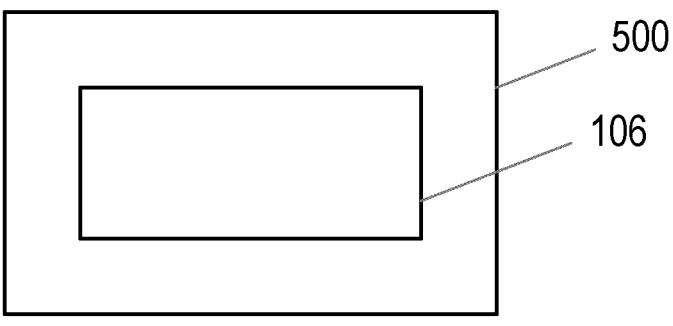
FIG. 5 illustrates a carrier of a computer program.

A computer program may be comprised on or in a carrier 500, as shown in FIG. 5, adapted to put embodiments into practice.

Figure 6:
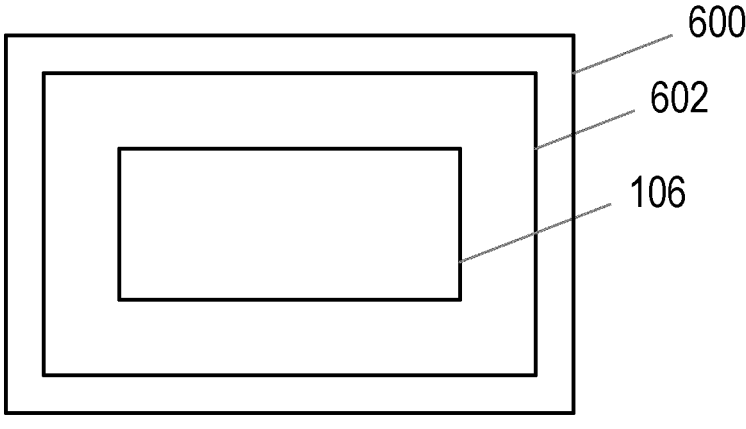
FIG. 6 illustrates a computer program product according to some embodiments herein.

In other embodiments, as shown in FIG. 6, there is a computer program product 600 comprising non-transitory computer readable media 602 having stored thereon a computer program 106.

In more detail, the program 106 may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may be or include a computer readable storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method performed by a security system for use in monitoring a computing system with respect to a recovery scenario from which the computing system would require recovery, the method comprising:

i) obtaining system recovery indicators for the computing system, wherein the system recovery indicators are associated with classifications indicating whether each system recovery indicator is a comparatively early indicator of the recovery scenario or a comparatively late indicator of the recovery scenario, when compared to other system recovery indicators, as the recovery scenario unfolds, and wherein a model further takes as input the classification for each system recovery indicator;

ii) predicting a likelihood that the computing system will undergo the recovery scenario from the system recovery indicators using the model trained using a machine learning process that takes as input the system recovery indicators and providing an associated one or more pre-emptive actions that should be performed based on a type of predicted recovery scenario; and iii) responsive to the predicted likelihood, performing the one or more pre-emptive actions so as: to secure the computing system against occurrence of the recovery scenario; reduce impact of an emerging recovery scenario; or to enable the computing system to be recovered following occurrence of the recovery scenario; and wherein the pre-emptive actions comprise one or more of:

taking an image of part of the computing system; and moving or encrypting data within the computing system.

2. The method as in claim 1, wherein the model outputs the likelihood that the computing system will undergo the recovery scenario.

3. The method as in claim 2, wherein the model has been trained using training data comprising a training example, each training example comprising: example system recovery indicators obtained for an example computing system, and a ground truth likelihood that said example computing system will undergo the recovery scenario.

4. The method as in claim 3, further comprising:

requesting the model from a repository comprising a plurality of trained models; and responsive to determining that none of the trained models in the repository take as input the system recovery indicators, training the model, using the training data.

5. The method of claim 1, wherein the model is a decision tree or a random forest-based classifier.

6. The method of claim 1, wherein the system recovery indicators comprise data representing:

system access patterns;

traffic flow patterns through the system; and/or indicators of system vulnerabilities.

7. The method of claim 1, wherein the system recovery indicators are determined during a predetermined sliding time interval.

8. The method of claim 1, wherein the likelihood that the computing system will undergo the recovery scenario is predicted for a predetermined time interval after the system recovery indicators were obtained.

9. The method of claim 1, wherein the recovery scenario is caused by:

an external attack on the computing system;

an internal security breach;

a system failure of the computing system;

an adverse environmental condition;

an uncontrolled system change; and/or human error.

10. The method of claim 1, wherein the pre-emptive actions in addition comprise: applying a security control to the computing system.

11. The method of claim 1, further comprising:

repeating steps i) and ii) in an iterative manner on successive real-time system recovery indicators.

12. A computer program product comprising non transitory computer readable media having stored thereon a computer program which when executed on at least one processor of a security system, cause the security system to carry out a method according to claim 1.

13. A security system for use in monitoring a computing system with respect to a recovery scenario from which the computing system would require recovery, the security system comprising:

a memory comprising instruction data representing a set of instructions; and a processor configured to communicate with the memory and to execute the set of instructions, wherein the set of instructions, when executed by the processor, cause the security system to:

i) obtain system recovery indicators for the computing system, wherein the system recovery indicators are associated with classifications indicating whether each system recovery indicator is a comparatively early indicator of the recovery scenario or a comparatively late indicator of the recovery scenario, when compared to other system recovery indicators, as the recovery scenario unfolds, and wherein a model further takes as input the classification for each system recovery indicator;

ii) predict a likelihood that the computing system will undergo the recovery scenario from the system recovery indicators using the model trained using a machine learning process that takes as input the system recovery indicators and provide an associated one or more pre-emptive actions that should be performed based on a type of predicted recovery scenario; and iii) responsive to the predicted likelihood, perform the one or more pre-emptive actions so as: to secure the computing system against occurrence of the recovery scenario; reduce impact of an emerging recovery scenario; or to enable the computing system to be recovered following occurrence of the recovery scenario; and wherein the pre-emptive actions comprise one or more of:

taking an image of part of the computing system; and moving or encrypting data within the computing system.

14. The security system as in claim 13, wherein the model outputs the likelihood that the computing system will undergo the recovery scenario.

15. The security system as in claim 14, wherein the model has been trained using training data comprising a training example, each training example comprising: example system recovery indicators obtained for an example computing system, and a ground truth likelihood that said example computing system will undergo the recovery scenario.

16. The security system as in claim 15, wherein the set of instructions, when executed by the processor, further cause the security system to:

request the model from a repository comprising a plurality of trained models; and responsive to determining that none of the trained models in the repository take as input the system recovery indicators, train the model, using the training data.

17. The security system as in claim 13, wherein the model is a decision tree or a random forest-based classifier.

18. The security system as in claim 13, wherein the system recovery indicators comprise data representing:

system access patterns;

traffic flow patterns through the system; and/or indicators of system vulnerabilities.

19. The security system as in claim 13, wherein the system recovery indicators are determined during a predetermined sliding time interval.

\* \* \* \* \*